(12) United States Patent
Shoji et al.

(10) Patent No.: US 8,389,925 B2
(45) Date of Patent: Mar. 5, 2013

(54) OPTICAL ENCODER DEVICE COMPRISING A MOVEABLE SLIT PLATE AND A STATIONARY SLIT PLATE

(75) Inventors: Yoshihiro Shoji, Nagano (JP); Yoshi Ishizuka, Nagano (JP); Shoji Ito, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 349 days.

(21) Appl. No.: 12/921,259

(22) PCT Filed: Mar. 6, 2009

(86) PCT No.: PCT/JP2009/054323
§ 371 (c)(1),
(2), (4) Date: Sep. 7, 2010

(87) PCT Pub. No.: WO2009/110604
PCT Pub. Date: Sep. 11, 2009

(65) Prior Publication Data
US 2011/0036970 A1    Feb. 17, 2011

(30) Foreign Application Priority Data

Mar. 7, 2008   (JP) .................................. 2008-058288

(51) Int. Cl.
*G01D 5/34* (2006.01)
(52) U.S. Cl. ..................... 250/231.18; 356/617; 359/441
(58) Field of Classification Search .............. 250/231.13–231.18, 237 G, 237 R; 341/11, 13, 31; 359/436–442, 566; 33/1 PT, 33/1 N
See application file for complete search history.

(56) References Cited

U.S. PATENT DOCUMENTS

| 4,663,588 A | 5/1987 | Himuro |
| 4,680,466 A * | 7/1987 | Kuwahara et al. ....... 250/231.14 |

(Continued)

FOREIGN PATENT DOCUMENTS

| JP | 60-042616 | 3/1985 |
| JP | 60-042626 | 3/1985 |

(Continued)

OTHER PUBLICATIONS

First Office Action of corresponding Chinese application, dated Dec. 13, 2011, with English translation, twelve pages.

*Primary Examiner* — Francis M Legasse, Jr.
(74) *Attorney, Agent, or Firm* — Rankin, Hill & Clark LLP

(57) ABSTRACT

An optical encoder device is provided, in which the number of light transmissive slits of a stationary slit plate can be increased as much as possible according to the length of a light receiving surface of a light receiving element to produce an output signal with little distortion. A movable slit plate 3 includes a slit row R1 in which a plurality of light transmissive slits (light transmissive portions) S1 each having a slit width of 180° in terms of electrical angle and a plurality of light non-transmissive slits (light non-transmissive portions) S2 each having a slit width of 180° in terms of electrical angle are alternately formed. A stationary slit plate 4 includes a slit row R2 in which a plurality of light transmissive slits S3 each having a slit width of 180° in terms of electrical angle and a plurality of light non-transmissive slits S4 each having a slit width of $(360Xk-180)°$ in terms of electrical angle are alternately formed. k is a value that satisfies $k=1\pm(\frac{1}{3}n)$ where n denotes the number of the light transmissive slits S3.

11 Claims, 8 Drawing Sheets

U.S. PATENT DOCUMENTS

| | | | |
|---|---|---|---|
| 5,068,530 A | | 11/1991 | Ieki |
| 6,020,585 A | * | 2/2000 | Shimonaka et al. ..... 250/231.13 |
| 6,154,278 A | * | 11/2000 | Ito et al. ..................... 356/499 |
| 2005/0077457 A1 | | 4/2005 | Hofer |

FOREIGN PATENT DOCUMENTS

| | | |
|---|---|---|
| JP | 60-237317 | 11/1985 |
| JP | 3-048122 | 3/1991 |
| JP | 08-184466 | 7/1996 |
| JP | 2539269 | 10/1996 |
| JP | 3184419 | 7/2001 |
| JP | 2005-121640 | 5/2005 |
| JP | 2007-218603 | 8/2007 |

* cited by examiner

OPTICAL ENCODER DEVICE COMPRISING A MOVEABLE SLIT PLATE AND A STATIONARY SLIT PLATE

TECHNICAL FIELD

The present invention relates to an optical encoder device that provides an output signal with little distortion.

BACKGROUND ART

An optical encoder device according to the related art includes a stationary slit plate having light transmissive silts disposed at a pitch of 360° and is likely to output a signal with much distortion, thereby reducing detecting accuracy. To solve the problem, Japanese Patent Application Publication No. 2007-218603 (JP2007-218603A) teaches a known example of an optical encoder device that provides an output signal with little distortion. In the known optical encoder device, slits provided in a stationary slit plate have the following slit pattern. The slits of the stationary slit plate have a phase difference of 1/12 with respect to the pitch P of slits provided in a movable slit plate. The light transmissive slits of the stationary slit plate are divided into units so that each unit includes slits of which number is equivalent to a multiple of four. In each unit, with respect to the first slit as a reference, the first and second slits are shifted in phase by P/12, the second and third slits are shifted in phase by P/6, and the third and fourth slits are shifted in phase by P/4.

Japanese Patent Application Publication No. 60-042626 (JP60-042626A) teaches an optical encoder in which two slits have a phase difference of 1/6 to cancel a third harmonic wave.

Japanese Patent No. 2539269 (JP2539269) teaches an optical encoder in which two slits or two slit groups have a phase difference of 1/6 or 1/10 to cancel a third harmonic wave or a fifth harmonic wave.

Japanese Patent No. 3184419 (JP3184419) describes that n orders of harmonic waves are canceled by using $2^n$ or more slits.

DISCLOSURE OF THE INVENTION

Technical Problem

In the optical encoder device disclosed in JP2007-218603A, it is necessary to provide a plurality of light transmissive slits in the stationary slit plate and to group the light transmissive slits into units, each unit including four light transmissive slits. Although a light receiving surface of a light receiving element may be long enough to receive light corresponding to seven light transmissive slits, for example, only four light transmissive slits can be formed in the stationary slit plate in this case. Thus, the function of the light receiving element cannot effectively be utilized.

According to the techniques disclosed in JP2007-218603A, JP60-042626A, JP2539269, and JP3184419, only a predetermined number of light transmissive slits may be formed in the stationary slit plate. Thus, taking into consideration the finite length of the light receiving element, a necessary number of light transmissive slits may not be provided, or the light receiving element may uselessly be long. According to the conventional techniques, if the number of the light transmissive slits which can be disposed is less than five, for example, the distortion rate, which is the root mean square of the ratio of the harmonic-wave components to the 21th order harmonic waves in this case, remains as high as 1.5% or more.

An object of the present invention is to provide an optical encoder device in which the number of light transmissive slits formed in a stationary plate may be maximally increased according to the length of a light receiving surface of a light receiving element and an output signal with little distortion may be obtained.

Solution to Problem

An optical encoder device of a first invention comprises a light emitting element, a light receiving element disposed to face the light emitting element, a movable slit plate disposed between the light emitting element and the light receiving element, and a stationary slit plate disposed between the light emitting element and the light receiving element. The movable slit plate includes a slit row in which a plurality of light transmissive slits each having a slit width of 180° in terms of angle and a plurality of light non-transmissive slits each having a slit width of 180° in terms of angle are alternately formed in a moving direction of the movable slit plate. The light transmissive slits may arbitrarily be formed as long as they may transmit light. They are not limited to through holes, but may be provided by forming a plurality of window portions that transmit light in a light transmissive substrate. It is not always necessary to physically provide the light non-transmissive slits. It is sufficient to provide non-transmissive portions. For example, a light non-transmissive slit may be formed by forming a film that does not transmit light on a light transmissive substrate. The term "moving direction" used herein means a direction in which the movable slit plate moves with respect to the stationary slit plate. The stationary slit plate includes a slit row in which plurality of light transmissive slits each having a slit width of 180° in terms of angle and a plurality of light non-transmissive slits each having a slit width of $(360Xk-180)°$ in terms of angle are alternately formed. In particular, according to the present invention, when the number of the light transmissive slits formed in the stationary slit plate is defined as n where n is an integer of five or more, the coefficient k is a value that satisfies $K=1\pm(1/3n)$.

According to the present invention, when the number of the light transmissive slit is five or more, the most appropriate number of the light transmissive slits may be formed in the stationary slit plate to maximize the utilization of the light receiving surface of the light receiving element by arranging the light transmissive slits at an interval equal to the slit width of $(360Xk-180)°$ of the light non-transmissive slits, which is determined by the coefficient k. Thus, according to the present invention, an output signal with little distortion may be obtained. Compared with the optical encoder device disclosed in JP2007-218603A where the light transmissive slits must be formed in units of four, the number of the light transmissive slits formed in the stationary slit plate may be maximally increased according to the length of the light receiving surface of the light receiving element.

Accordingly, if the value of n is defined such that the length of the slit row of the stationary slit plate may be as approximate as possible to the usable length of the light receiving surface of the light receiving element, the light receiving element may be utilized as much as possible.

If the distortion rate of waveform of an output from the light receiving element is reduced, a multiplication circuit that electrically multiplies an optical signal outputted from the light receiving element may increase its multiplication accuracy. The present invention is particularly appropriate for an optical encoder device that includes a multiplication circuit.

In a second invention, two slit rows are disposed in a stationary slit plate to address the problem to be solved by the invention. In the second invention, the stationary slit plate is disposed between a light emitting element and a light receiving element. The stationary slit plate includes two slit rows in which a plurality of light transmissive slits each having a slit width of 180° in terms of angle and a plurality of light non-transmissive slits each having a slit width of (360Xk-180)° in terms of angle are alternately formed in a moving direction of a movable slit plate. The two slit rows of the stationary slit plate are arranged in a width direction orthogonal to the moving direction. Here, the value of k satisfies k=1±(⅓n). The total number of the light transmissive slits formed in the stationary slit plate is defined as n where n is an integer of five or more. When the value of n is defined as n=2q-r where q is an integer of two or more and r is an integer of 0≦r<q, the two slit rows of the stationary slit plate each include q light transmissive slits when r=0, and one of the two slit rows of the stationary slit plate includes q light transmissive slits and the other slit row of the stationary slit plate includes q-r light transmissive slits when r≠0. The two slit rows of the stationary slit plate are shifted in position from each other in the moving direction by (360-360Xk)X(q-r)°.

When two slit rows of the stationary slit plate are arranged according to the second invention, the usable size, in the length direction, of a light receiving surface of the light receiving element may be reduced. Also, the light receiving element may be utilized as much as possible by maximally utilizing the length and the width of the light receiving surface of the light receiving element.

According to a third invention, three or more slit rows are disposed in a stationary slit plate to address the problem to be solved by the present invention. Thus, in the third invention, the stationary slit plate disposed between the light emitting element and the light receiving element includes m slit rows where m is an integer of three or more. In the m slit rows, a plurality of light transmissive slits each having a slit width of 180° in terms of angle and a plurality of light non-transmissive slits each having a slit width of (360Xk-180)° in terms of angle are alternately formed in the moving direction of the movable slit plate. The m slit rows of the stationary slit plate are arranged in a width direction orthogonal to the moving direction.

In the third invention, the value of k satisfies k=1±(⅓n). The total number of the light transmissive slits formed in the stationary slit plate is defined as n where n is an integer of five or more. The value of n is defined as follows:

$$n = qm - \sum_{x=1}^{m-1} r_x$$

where q is an integer of two or more and $r_x$ is an integer of 0≦r<q.

In this case, the m slit rows of the stationary slit plate each include q light transmissive slits when r=0, and each include q-$r_x$ light transmissive slits when r≠0. The m slit rows of the stationary slit plate are constituted from m kinds of slit rows that are shifted in position from each other in the moving direction by (360-360Xk)X(q-r)°.

According to the second and third inventions, the light transmissive slits of the movable slit plate may be configured similarly to those of the first invention.

According to the third invention as with the second invention, the usable size, in the length direction, of a light receiving surface of the light receiving element may be reduced. Also, the light receiving element may be utilized as much as possible by maximally utilizing the length and the width of the light receiving surface of the light receiving element.

According to both of the second and third inventions, two adjacent light transmissive slits may be separate from or continuous with each other in the width direction. Since lights passing through two adjacent light transmissive slits are received by the same light receiving element whether the slits are separate or continuous, signals may be processed without any problem.

BEST MODE FOR CARRYING OUT THE INVENTION

Figure 1:
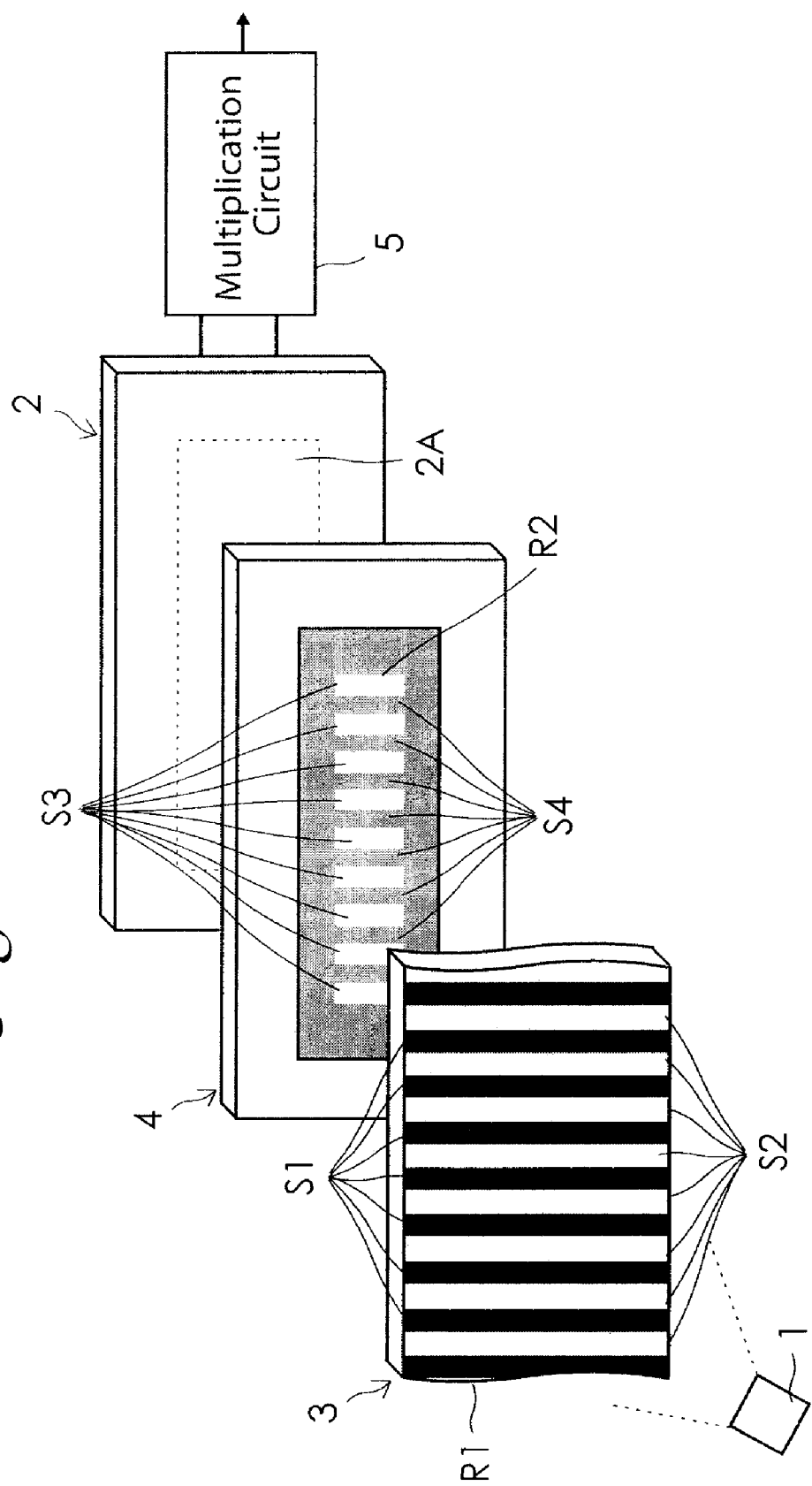
FIG. 1 is a perspective view schematically showing an exemplary optical encoder device.

Embodiments of an optical encoder device according to the present inventions will now be described in detail with reference to the accompanying drawings. FIG. 1 is a perspective view schematically showing an exemplary optical encoder device according to an embodiment of the first invention. In FIG. 1, reference numeral 1 denotes a light emitting element which is constituted, for example, from a light emitting diode, and reference numeral 2 denotes a light receiving element constituted from a semiconductor substrate that has a function of converting a light signal into an electrical signal and outputting the electrical signal. A movable slit plate 3 and a stationary slit plate 4 fixed to a stationary portion (not shown) are disposed between the light emitting element 1 and the light receiving element (photoelectric conversion element) 2. The movable slit plate 3 is a rectangular plate in FIG. 1, but the present invention may also be applicable to a circular rotary movable slit plate. In the present embodiment, a multiplication circuit 5 is provided to electrically multiply an electrical signal outputted from the light receiving element 2. In such a configuration, when the light emitting element 1 emits parallel light beams, light passes through light transmissive slits S1 of the movable slit plate 3 and light transmissive slits S3 of the stationary slit plate 4, which will be discussed later, and then is incident on the light receiving element 2. The light receiving element 2 then converts the incident light into an electrical signal according to the intensity of light and outputs the electrical signal. The electrical signal is caused by changes in amount of light which has transmitted through the light transmissive slits S1 of the movable slit plate 3 and the light transmissive slits S3 of the stationary slit plate 4.

Figure 2:
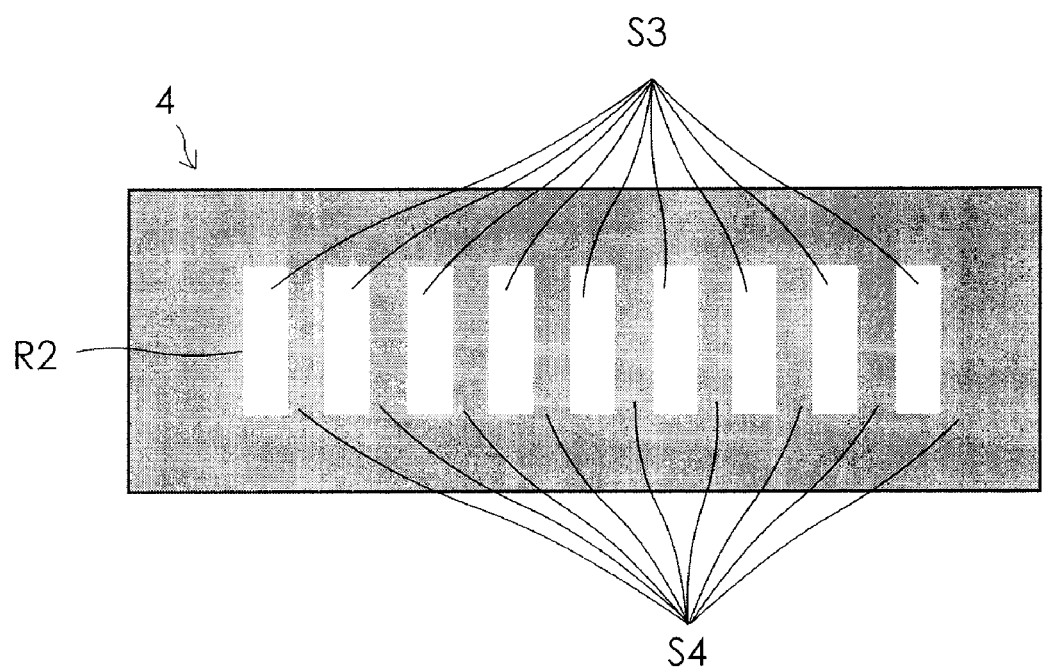
FIG. 2 is a conceptual diagram of a stationary slit plate according to an embodiment of the first invention in which a slit pitch or interval is varied.

The movable slit plate 3 includes a slit row R1 in which a plurality of light transmissive slits S1 (portions that transmit light) each having a slit width of 180° in terms of angle and a plurality of light non-transmissive slits S2 (portions that do not transmit light) each having a slit width of 180° in terms of angle are alternately formed. The stationary slit plate 4 includes a slit row R2 in which a plurality of light transmissive slits S3 each having the slit width of 180° in terms of angle and a plurality of light non-transmissive slits S4 each having the slit width of (360Xk-180)° in terms of angle, where k<1, are alternately formed, as schematically shown in FIG. 2 as a slit pattern. Here, when the number of the light transmissive slits S3 formed in the stationary slit plate 4 is defined as n where n is an integer of five or more, the coefficient k is a value satisfying the expression of k=1±(⅓n). As is described in detail below, if the number of the light transmissive slits S3 equals to or more than five, the most appropriate number of light transmissive slits may be formed in the stationary slit plate to maximally utilize a light receiving surface 2A of the light receiving element 2 by arranging the light transmissive slits at an interval equal to the slit width of (360Xk-180)° of the light non-transmissive slit S4, which is determined by the coefficient k. In other words, according to the present invention, the pitch of the light transmissive slits S3 (distance between the centers of two adjacent light transmissive slits S3) is defined as 360Xk° as shown in FIG. 2. As a result, compared with the conventional optical encoder device of JP2007-218603A in which light transmissive slits must be disposed in units of four, the number of the light transmissive slits S3 formed in the stationary slit plate 4 may be increased as much as possible according to the length of the light receiving surface 2A of the light receiving element 2.

Figure 3:
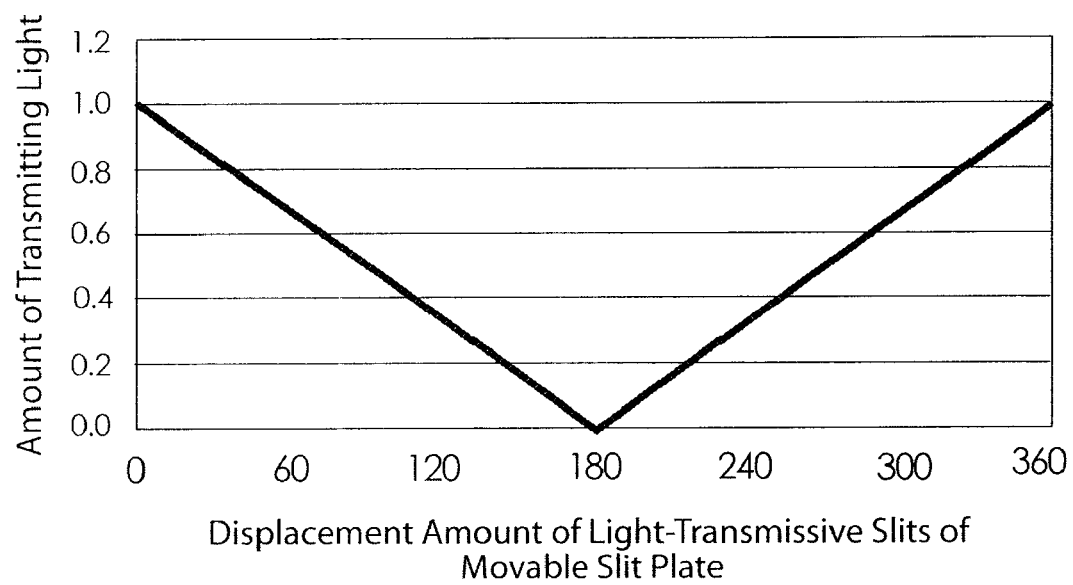
FIG. 3 is a graph showing the relationship of the amount of transmitting light and displacement amount of light transmissive slits of a movable slit plate in an ideal optical system.

Next, the grounds for determining the coefficient k and effects of the present embodiment will be described. When the multiplication circuit 5 is used to obtain higher pulse as with the present embodiment, signals used for multiplication are required to be approximately sinusoidal. However, in the ideal optical system, the amount of light passing through the light transmissive slits S1 of the movable slit plate 3 varies linearly. As a result, the obtained signal is a triangular wave. FIG. 3 shows the relationship of the amount of transmitting light and the displacement amount of the light transmissive slits S1 of the movable slit plate 3. The triangular wave is represented by the following expression (1), where the slit width of the light transmissive slit S1 and the light non trans-missive slit S2 in the movable plate 3 is defined as one pitch or cycle (360° in terms of angle):

$$g(\theta) = 0.5 + \frac{4}{\pi^2}\left\{\cos(\theta) + \frac{\cos(3\theta)}{3^2} + \frac{\cos(5\theta)}{5^2} + \frac{\cos(7\theta)}{7^2} + \ldots\right\} \quad (1)$$

In the above expression, the amplitude of a third harmonic wave component is equivalent to about 11% of that of the fundamental wave component, the amplitude of a fifth harmonic wave component is equivalent to about 4% of that of the fundamental wave component, and the amplitude of a seventh harmonic wave component is equivalent to about 2% of that of the fundamental wave component. This corresponds to the distortion rate (the root mean square of the ratio of the harmonic-wave components up to the $21^{th}$ harmonic wave) of 11.98%. Here, as with stationary slit plates used in general optical encoder devices, it is assumed that the slit width of each light transmissive slit and that of each light non-transmissive slit of the stationary slit plate are 180° and that the pitch of two adjacent light transmissive slits is 360°. It is also assumed to use a movable slit plate in which the slit width of each light transmissive slit and that of each light non-transmissive slit are 180° and that the pitch of two adjacent light transmissive slits is 360°. In such a general optical encoder device, the pitch of the light transmissive slits and that of the light non-transmissive slits are the same, thereby causing no phase difference. As a result, a synthesized signal is obtained simply by multiplying the signal by the number of the slits n as shown in the following expression (2):

$$G(\theta) = n\left[0.5 + \frac{4}{\pi^2}\left\{\cos(\theta) + \frac{\cos(3\theta)}{3^2} + \frac{\cos(5\theta)}{5^2} + \frac{\cos(7\theta)}{7^2} + \ldots\right\}\right] \quad (2)$$

Here, how to cancel the third-order component in the above expression (2) is discussed. In the stationary slit plate for use in the present embodiment as shown in FIG. 2 in which the slit pitch or interval is varied, the pitch (interval) of the light transmissive slits S3 is varied to 360Xk° using a constant coefficient k. FIG. 2 shows an example when k<1. Signals, which have been obtained when light passes through each light transmissive slit S3, have respective phase differences corresponding to the distance from the central light-transmissive slit with respect to a signal obtained when light passes through the light transmissive slit S3 located in the center of the slit row R2. Thus, the synthesized signal is represented by the following expression (3) where n=9:

$$G'(\theta) = 0.5 + \frac{4}{\pi^2}\left\{\cos(\theta) + \frac{\cos(3\theta)}{3^2} + \frac{\cos(5\theta)}{5^2} + \frac{\cos(7\theta)}{7^2} + \ldots\right\} + 0.5 + \quad (3)$$

$$\frac{4}{\pi^2}\left\{\cos(\theta + 360 \times k) + \frac{\cos(3(\theta + 360 \times k))}{3^2} + \frac{\cos(5(\theta + 360 \times k))}{5^2} + \frac{\cos(7(\theta + 360 \times k))}{7^2} + \ldots\right\} + 0.5 +$$

$$\frac{4}{\pi^2}\left\{\cos(\theta - 360 \times k) + \frac{\cos(3(\theta - 360 \times k))}{3^2} + \frac{\cos(5(\theta - 360 \times k))}{5^2} + \frac{\cos(7(\theta - 360 \times k))}{7^2} + \ldots\right\} + 0.5 +$$

$$\frac{4}{\pi^2}\left\{\cos(\theta + 360 \times k \times 2) + \frac{\cos(3(\theta + 360 \times k \times 2))}{3^2} + \frac{\cos(5(\theta + 360 \times k \times 2))}{5^2} + \frac{\cos(7(\theta + 360 \times k \times 2))}{7^2} + \ldots\right\} + 0.5 +$$

$$\frac{4}{\pi^2}\left\{\cos(\theta - 360 \times k \times 2) + \frac{\cos(3(\theta - 360 \times k \times 2))}{3^2} + \frac{\cos(5(\theta - 360 \times k \times 2))}{5^2} + \frac{\cos(7(\theta - 360 \times k \times 2))}{7^2} + \ldots\right\} + 0.5 +$$

$$\frac{4}{\pi^2}\left\{\cos(\theta + 360 \times k \times 3) + \frac{\cos(3(\theta + 360 \times k \times 3))}{3^2} + \frac{\cos(5(\theta + 360 \times k \times 3))}{5^2} + \frac{\cos(7(\theta + 360 \times k \times 3))}{7^2} + \ldots\right\} + 0.5 +$$

$$\frac{4}{\pi^2}\left\{\cos(\theta - 360 \times k \times 3) + \frac{\cos(3(\theta - 360 \times k \times 3))}{3^2} + \frac{\cos(5(\theta - 360 \times k \times 3))}{5^2} + \frac{\cos(7(\theta - 360 \times k \times 3))}{7^2} + \ldots\right\} + 0.5 +$$

-continued $$\frac{4}{\pi^2}\left\{\cos(\theta+360\times k\times 4)+\frac{\cos(3(\theta+360\times k\times 4))}{3^2}+\frac{\cos(5(\theta+360\times k\times 4))}{5^2}+\frac{\cos(7(\theta+360\times k\times 4))}{7^2}+\ldots\right\}+$$

$$0.5+\frac{4}{\pi^2}\left\{\cos(\theta-360\times k\times 4)+\frac{\cos(3(\theta-360\times k\times 4))}{3^2}+\frac{\cos(5(\theta-360\times k\times 4))}{5^2}+\frac{\cos(7(\theta-360\times k\times 4))}{7^2}+\ldots\right\}$$

Also when the number n of the slits is even, the synthesized signal is represented by the following expression (4) where n=8:

$$G'(\theta)=0.5+\frac{4}{\pi^2}\left\{\begin{array}{l}\cos(\theta+((360\times 1-180)\times k-180))+\frac{\cos(3(\theta+(360\times 1-180)\times k-180))}{3^2}+\\ \frac{\cos(5(\theta+(360\times 1-180)\times k-180))}{5^2}+\frac{\cos(7(\theta+(360\times 1-180)\times k-180))}{7^2}+\ldots\end{array}\right\}+ \quad (4)$$

$$0.5+\frac{4}{\pi^2}\left\{\begin{array}{l}\cos(\theta-((360\times 1-180)\times k-180))+\frac{\cos(3(\theta-(360\times 1-180)\times k+180))}{3^2}+\\ \frac{\cos(5(\theta-(360\times 1-180)\times k+180))}{5^2}+\frac{\cos(7(\theta-(360\times 1-180)\times k+180))}{7^2}+\ldots\end{array}\right\}+$$

$$0.5+\frac{4}{\pi^2}\left\{\begin{array}{l}\cos(\theta+((360\times 2-180)\times k-180))+\frac{\cos(3(\theta+(360\times 2-180)\times k-180))}{3^2}+\\ \frac{\cos(5(\theta+(360\times 2-180)\times k-180))}{5^2}+\frac{\cos(7(\theta+(360\times 2-180)\times k-180))}{7^2}+\ldots\end{array}\right\}+$$

$$0.5+\frac{4}{\pi^2}\left\{\begin{array}{l}\cos(\theta-((360\times 2-180)\times k-180))+\frac{\cos(3(\theta-(360\times 2-180)\times k+180))}{3^2}+\\ \frac{\cos(5(\theta-(360\times 2-180)\times k+180))}{5^2}+\frac{\cos(7(\theta-(360\times 2-180)\times k+180))}{7^2}+\ldots\end{array}\right\}+$$

$$0.5+\frac{4}{\pi^2}\left\{\begin{array}{l}\cos(\theta+((360\times 3-180)\times k-180))+\frac{\cos(3(\theta+(360\times 3-180)\times k-180))}{3^2}+\\ \frac{\cos(5(\theta+(360\times 3-180)\times k-180))}{5^2}+\frac{\cos(7(\theta+(360\times 3-180)\times k-180))}{7^2}+\ldots\end{array}\right\}+$$

$$0.5+\frac{4}{\pi^2}\left\{\begin{array}{l}\cos(\theta-((360\times 3-180)\times k-180))+\frac{\cos(3(\theta-(360\times 3-180)\times k+180))}{3^2}+\\ \frac{\cos(5(\theta-(360\times 3-180)\times k+180))}{5^2}+\frac{\cos(7(\theta-(360\times 3-180)\times k+180))}{7^2}+\ldots\end{array}\right\}+$$

$$0.5+\frac{4}{\pi^2}\left\{\begin{array}{l}\cos(\theta+((360\times 4-180)\times k-180))+\frac{\cos(3(\theta+(360\times 4-180)\times k-180))}{3^2}+\\ \frac{\cos(5(\theta+(360\times 4-180)\times k-180))}{5^2}+\frac{\cos(7(\theta+(360\times 4-180)\times k-180))}{7^2}+\ldots\end{array}\right\}+$$

$$0.5+\frac{4}{\pi^2}\left\{\begin{array}{l}\cos(\theta-((360\times 4-180)\times k-180))+\frac{\cos(3(\theta-(360\times 4-180)\times k+180))}{3^2}+\\ \frac{\cos(5(\theta-(360\times 4-180)\times k+180))}{5^2}+\frac{\cos(7(\theta-(360\times 4-180)\times k+180))}{7^2}+\ldots\end{array}\right\}$$

Here, the above expressions (3) and (4) may be represented by the following expressions (5) and (6) for the high-order components:

$$G'(\theta)=4.5+\frac{4}{\pi^2}\left[\begin{array}{l}\{1+2\cos(360\times k)+2\cos(360\times k\times 2)+2\cos(360\times k\times 3)+2\cos(360\times k\times 4)\}\cos(\theta)+\\ \frac{\{1+2\cos(3\times 360\times k)+2\cos(3\times 360\times k\times 2)+2\cos(3\times 360\times k\times 3)+2\cos(3\times 360\times k\times 4)\}\cos(3\theta)}{3^2}+\\ \frac{\{1+2\cos(5\times 360\times k)+2\cos(5\times 360\times k\times 2)+2\cos(5\times 360\times k\times 3)+2\cos(5\times 360\times k\times 4)\}\cos(5\theta)}{5^2}+\\ \frac{\{1+2\cos(7\times 360\times k)+2\cos(7\times 360\times k\times 2)+2\cos(7\times 360\times k\times 3)+2\cos(7\times 360\times k\times 4)\}\cos(7\theta)}{7^2}+\ldots\end{array}\right] \quad (5)$$

-continued $$G'(\theta) = 4.5 - \frac{4}{\pi^2}\begin{bmatrix} \{2\cos(0.5\times360\times k-180)+2\cos(1.5\times360\times k-180)+2\cos(2.5\times360\times k-180)+2\cos(3.5\times360\times k-180)\}\cos(\theta) + \\ \frac{\{2\cos3(0.5\times360\times k-180)+2\cos3(1.5\times360\times k-180)+2\cos3(2.5\times360\times k-180)+2\cos3(3.5\times360\times k-180)\}\cos(3\theta)}{3^2} + \\ \frac{\{2\cos5(0.5\times360\times k-180)+2\cos5(1.5\times360\times k-180)+2\cos5(2.5\times360\times k-180)+2\cos5(3.5\times360\times k-180)\}\cos(5\theta)}{5^2} + \\ \frac{\{2\cos7(0.5\times360\times k-180)+2\cos7(1.5\times360\times k-180)+2\cos7(2.5\times360\times k-180)+2\cos7(3.5\times360\times k-180)\}\cos(7\theta)}{7^2} + \dots \end{bmatrix} \quad (6)$$

According to the above expressions (5) and (6), the amplitude A(N) of an N-th order signal component is represented by expression (7) when n is an odd number and by expression (8) when n is an even number.

$$A_{(N)} = \frac{4}{\pi^2} \times \frac{1 + 2\sum_{m=1}^{\frac{n-1}{2}} \cos(N\times 360 \times k \times m)}{N^2} \quad (7)$$

$$A_{(N)} = \frac{4}{\pi^2} \times \frac{-2\sum_{m=1}^{\frac{n}{2}} \cos\{N\times 360 \times k \times (m-0.5)\}}{N^2} \quad (8)$$

Figure 4:
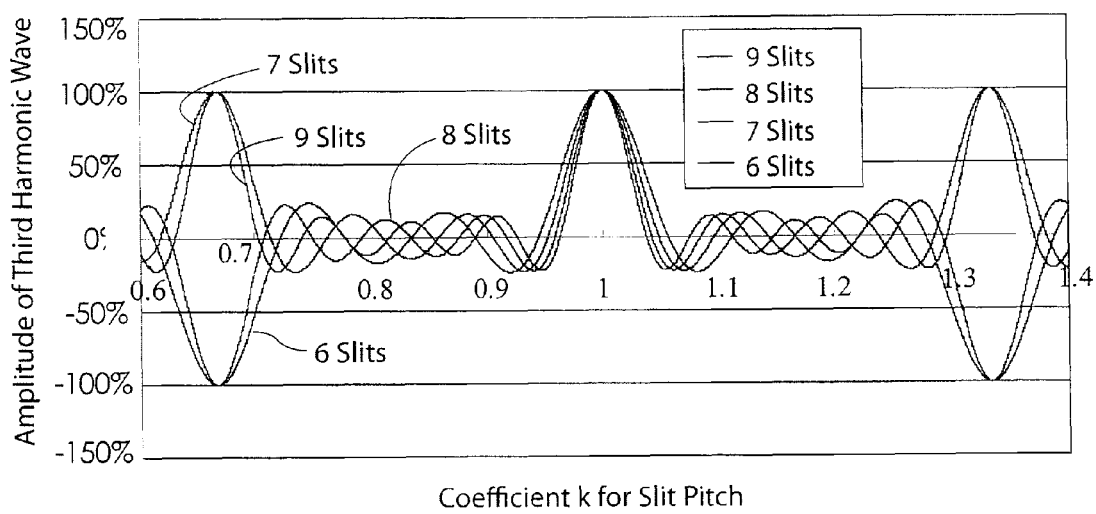
FIG. 4 is a graph showing the relationship of the amplitude of a third harmonic wave and a coefficient k of the pitch (interval of slits) when the number n of the light transmissive slits is six through nine.

FIG. 4 shows the relationship of the amplitude of a third harmonic wave and the coefficient k for the pitch (slit, interval) when the number n of the light transmissive slits is six to nine. As known from the above expressions (7) and (8) and also shown in FIG. 4, the amplitude of each order component is periodically varied according to the coefficient k, and the pitch or cycle is inversely proportional to N. Accordingly, in order to cancel the third component, the value of k may be defined such that the expressions (7) and (8) result in 0 when N=3. However, it is required that a multiplied signal should include few harmonic wave components and have a large amplitude. Therefore, the value of k needs to be close to 1, and maybe represented by the following expression (9):

$$k = 1 \pm \frac{1}{N \times n} \quad (9)$$

Figure 5:
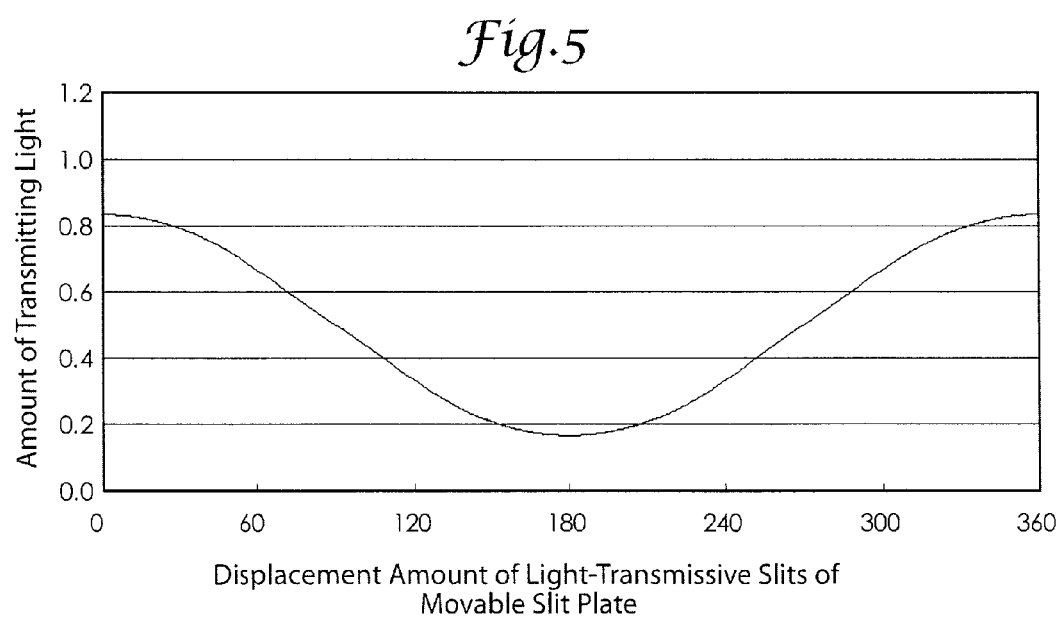
FIG. 5 is a graph showing the relationship of the amount of transmitting light and displacement amount of one light transmissive slit of the movable slit plate.

From the above expression (9), the value of k to cancel the third harmonic wave is obtained as k=0.963 or k=1.037 when n=9, for example. Although the amplitude of the fundamental wave with k=0.963 or 1.037 is equivalent to 82.9% of that of the fundamental wave with k=1, the amplitude of a third harmonic wave is equivalent to 0%, the amplitude of a fifth harmonic wave is equivalent to about 0.85%, and the amplitude of a seventh harmonic wave is equivalent to about 0.33% of the amplitude of the fundamental wave. Then, the distortion rate is 0.92%. FIG. 5 shows the relationship of the amount of transmitting light and the amount of displacement of the light transmissive slit S1 in the movable slit plate with respect to one light transmissive slit S3. As long as FIG. 5 shows, it is found that the variation of the light amount is indistinguishable from a sine wave. Table 1 below shows the number n of the light transmissive slits S3, the distortion rate (the root mean square of the ratio of the harmonic-wave components up to the 21-th harmonic wave) of an output waveform, and amplitudes of fundamental waves with the value of k which is obtained from the above expression (9).

TABLE 1

| No. of slits | k | Distortion Rate | Amplitude of Fundamental Frequency |
|---|---|---|---|
| 1 | | 11.984% | 100.000% |
| 2 | 0.833 | 1.167 | 4.625% | 86.603% |
| 3 | 0.889 | 1.111 | 2.383% | 84.403% |
| 4 | 0.917 | 1.083 | 1.580% | 83.652% |
| 5 | 0.933 | 1.067 | 1.253% | 83.307% |
| 6 | 0.944 | 1.056 | 1.096% | 83.121% |
| 7 | 0.952 | 1.048 | 1.009% | 83.009% |
| 8 | 0.958 | 1.042 | 0.934% | 82.936% |
| 9 | 0.963 | 1.037 | 0.916% | 82.886% |
| 10 | 0.967 | 1.033 | 0.903% | 82.851% |
| 11 | 0.970 | 1.030 | 0.895% | 82.824% |
| 12 | 0.972 | 1.028 | 0.888% | 82.804% |
| 13 | 0.974 | 1.026 | 0.883% | 82.789% |
| 14 | 0.976 | 1.024 | 0.880% | 82.777% |
| 15 | 0.978 | 1.022 | 0.876% | 82.767% |

As known from Table 1, the distortion rate decreases as the number n of the light transmissive slit S3 increases. When n=5, the distortion rate decreases to about 1.25%. The amplitude of the fundamental wave also decreases as the number n of the light transmissive slit S3 increases. Thus, Table 1 indicates that the distortion rate may be reduced to about 1.5% or less by using the coefficient k which is calculated by the expression k=1±(⅓n) where n≧5 in order to remove the most influential third harmonic wave. The present invention has been made based on these findings.

According to the present invention, the light transmissive slits may simply be arranged using the slit width of (360Xk-180)° of the light non-transmissive slit which is determined by the coefficient k. Thus, the number of the light transmissive slits is not limited. The most appropriate number of light transmissive slits may be formed in the stationary slit plate to maximally utilize the light receiving surface of the light receiving element. As a result, according to the present invention, an output signal with little distortion may be obtained. Further, the number of the light transmissive slits S3 provided in the stationary slit plate 4 may be increased as much as possible according to the length of the light receiving surface 2A of the light receiving element 2, compared with a conventional light encoder device in which units of a predetermined number of light transmissive slits must be formed.

Although the present embodiment relates to a linear optical encoder device, the present invention may be applicable to a rotary encoder device. Further, the same effect may be obtained even if the physical relationship of the movable and stationary slit plates is changed.

Figure 6:
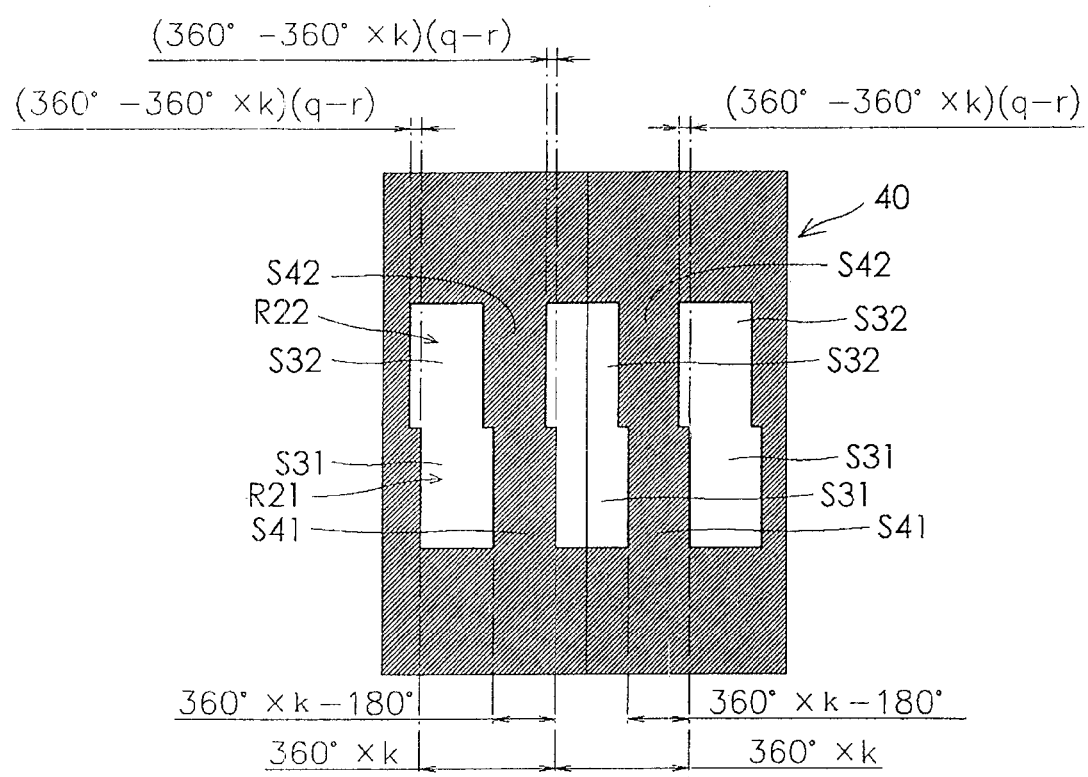
FIG. 6 is an exemplary stationary slit plate for use in an embodiment of the second invention.

FIG. 6 shows an exemplary stationary slit plate according to an embodiment of the second invention. Here, the stationary slit plate includes two slit rows that are disposed to solve the problem to be addressed by the present first invention. FIG. 6 shows a configuration of the stationary slit plate 40 for use in an embodiment of the second invention. Also in the second invention, the stationary slit plate 40 is also disposed between a light emitting element and a light receiving element. A movable slit plate may be configured similarly to that of the movable slit plate 3 of FIG. 1. Namely, the movable slit plate includes a slit row in which a plurality of light transmissive slits each having the slit width of 180° in terms of angle and a plurality of light non-transmissive slits each having the slit width of 180° in terms of angle are alternately formed in the moving direction. The stationary slit plate 40 includes a plurality of (six) light transmissive slits S31 and S32 each having the slit width of 180° in terms of angle and a plurality of (four) light non-transmissive slits S41 and S42 each having the slit width of (360Xk-180)° in terms of angle. Two slit rows R21 and R22 are provided in the stationary slit plate 40. In the two slit rows R21 and R22, the light transmissive slits and the light non-transmissive slits are alternately arranged in the moving direction of the movable slit plate. The two slit rows R21 and R22 of the stationary slit plate are arranged in a width direction orthogonal to the moving direction of the movable slit plate and are configured such that two adjacent light transmissive slits S31 and S32 are continuous to each other in the width direction.

According to the present embodiment, the value of k is defined as $k=1\pm(\frac{1}{3}n)$. The sum of the numbers of the light transmissive slits S31 and S32 formed in the stationary slit plate 40 is defined as n where n is an integer of five or more. Here in the embodiment of FIG. 6, n is defined as six (n=6). Assuming that n=2q-r where q is an integer of two or more and $0 \leq r < q$, FIG. 6 shows the two slit rows R21 and R22 of the stationary slit plate with r=0, each of which includes q light transmissive slits S31 and S32. Here in the embodiment of FIG. 6, q is defined as 3 (q=3).

The two slit rows R21 and R22 are shifted in position by (360-360*k)(q-r)° in the moving direction. With such arrangement of the two slit rows R21 and R22, the usable size, in the length direction, of the light receiving surface of the light receiving element may be shortened. Also, the light receiving element may be utilized as much as possible by maximally utilizing the length and the width of the light receiving surface of the light receiving element. According to the present embodiment, the distortion rate may be reduced, compared with that of the first embodiment shown in FIGS. 1 through 5 with n=q.

Figure 7:
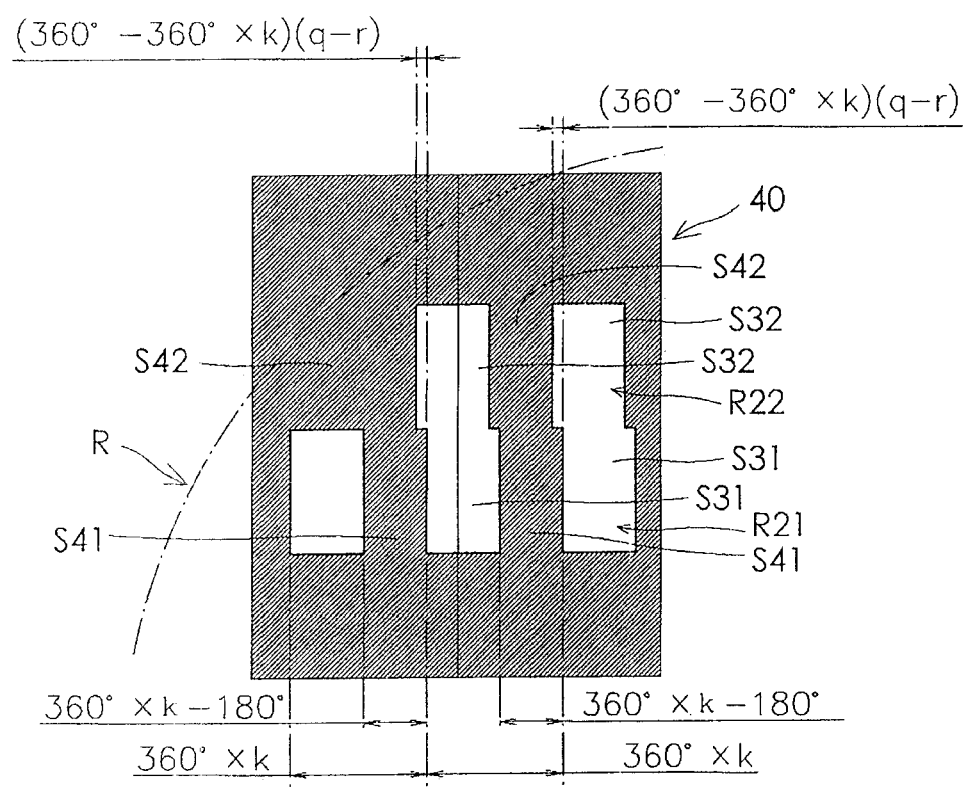
FIG. 7 is an exemplary stationary slit plate for use in another embodiment of the second invention.

FIG. 7 shows another embodiment of the second invention. According to the embodiment, unlike that of FIG. 6, the number of the light transmissive slits S32 included in the second slit row R22 is two, and any other configuration is similar to that of FIG. 6. In general, assuming that the total number of the light transmissive slits S31 and S32 formed in the stationary slit plate 40 is n where n is an integer of five or more and n=2q-r where q is an integer of two or more and $0 \leq r < q$, the slit row R21 includes q (in FIG. 7, q=3) light transmissive slits S31 and the other slit row R22 includes q-r (in FIG. 7, q-r=2) light transmissive slits S32 when r≠0.

Figure 8:
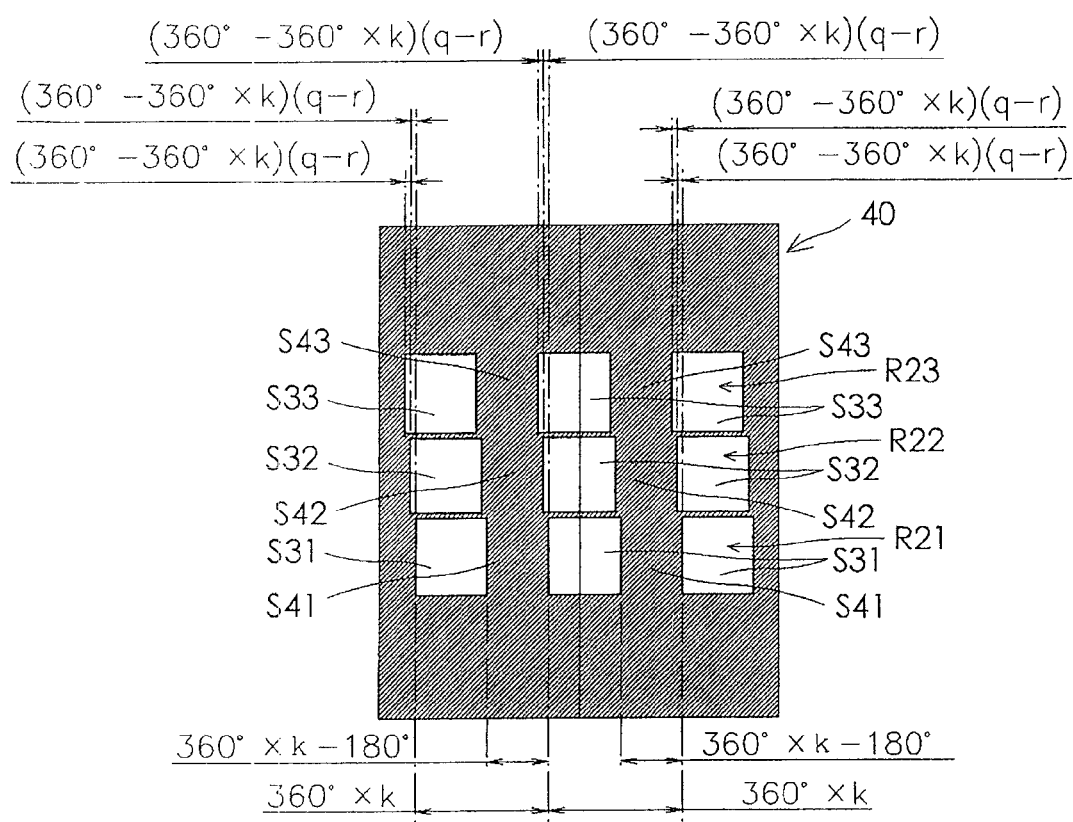
FIG. 8 is an exemplary stationary slit plate for use in an embodiment of the third invention.

FIG. 8 shows an embodiment of the third invention. According to the third invention, m (m is an integer of three or more) slit rows are arranged to address the problem to be solved by the present invention as with the first and second inventions. FIG. 8 shows a configuration of a stationary slit plate 40 for use in the embodiment of the third invention. Also in the third invention, the stationary slit plate 40 is also disposed between the light emitting element and the light receiving element. The configuration of a movable slit plate may be the same as that of the movable slit plate 3 of FIG. 1. Namely, the movable slit plate includes a slit row in which a plurality of light transmissive slits each having the slit width of 180° in terms of angle and a plurality of light non-transmissive slits each having the slit width of 180° in terms of angle are alternately formed. The stationary slit plate 40 includes a plurality of (nine) light transmissive slits S31, S32 and S33 each having the slit width of 180° in terms of angle and a plurality of (six) light non-transmissive slits S41, S42 and S43 each having the slit width of (360Xk-180)° in terms of angle. The stationary slit plate 40 includes three slit rows R21, R22 and R23 in which the light transmissive slits and the light non-transmissive slits are alternately formed in the moving direction of the movable slit plate. The three stationary slit rows R21, R22 and R23 are arranged in the width direction orthogonal to the moving direction of the movable slit plate. In the slit rows R21, R22, and R23, two adjacent light transmissive slits S31, S32 and S33 are separate from each other.

According to the present embodiment, k is generally defined as a value satisfying $k=1\pm(\frac{1}{3}n)$. When the total number of the light transmissive slits S31, S32 and S33 formed in the stationary slit plate 40 is defined as n where n is an integer of five or more, n is a value represented by the following expression:

$$n = qm - \sum_{x=1}^{m-1} r_x$$

where q is an integer of two or more and $r_x$ is an integer of $0 \leq r_x < q$.

It is found that m (in FIG. 8, m=3) slit rows of the stationary slit plate R21, R22 and R23 each include q (in FIG. 8, q=3) light transmissive slits when the values of $r_x$ are all zero. When the value of r is not zero, the slit rows each include (q-$r_x$) light transmissive slits. The m (in FIG. 8, m=3) slit rows are constituted from m kinds of slit rows that are shifted in position from each other by (360-360Xk)X(q-r)° in the moving direction. In the embodiment of FIG. 8, three slit rows R21 to R23 are arranged in this order in the width direction. However, the arrangement order is not limited to this and they may be arranged in any order such as R21→R23→R22 and R23→R21→R22. Also in the embodiment of FIG. 8, the number of the light transmissive slits in any one of the slit rows of the stationary slit plate may be reduced as with the embodiment of FIG. 7.

According to the present embodiment, three slit rows are provided. Thus, the number n of the slits is increased compared with the embodiments of FIGS. 6 and 7 in which two slit rows are provided in the stationary slit plate even when the value of q is equal. As a result, lower distortion rate is attained. In practice, the values of n, m and r may appropriately be determined taking into consideration the size of the light receiving element and the radiation range R of light emitted from the light emitting element as shown in FIG. 7. In the embodiment of FIG. 7, a light transmissive slit is not formed in the end portion of the slit rows R22 considering the radiation range R of light.

INDUSTRIAL APPLICABILITY

According to the present inventions, an output signal with little distortion may be obtained, and the number of the light transmissive slits formed in the stationary slit plate may be maximized according to the length and width of the light receiving surface of the light receiving element.

The invention claimed is:
1. An optical encoder device comprising:
a light emitting element;
a light receiving element disposed to face the light emitting element;

a movable slit plate disposed between the light emitting element and the light receiving element and including a slit row in which a plurality of light transmissive slits each having a slit width of 180° in terms of angle and a plurality of light non-transmissive slits each having a slit width of 180° in terms of angle are alternately formed in a moving direction of the movable slit plate, wherein a slit pitch is 360°; and a stationary slit plate disposed between the light emitting element and the light receiving element and including a slit row in which a plurality of light transmissive slits each having a slit width of 180° in terms of angle and a plurality of light non-transmissive slits each having a slit width of (360Xk-180)° in terms of angle are alternately formed, wherein:

defining the number of the plurality of light transmissive slits formed in the stationary slit plate as n where n is an integer of five or more, the value of k satisfies k=1±(⅓n).

2. An optical encoder device comprising:

a light emitting element;

a light receiving element disposed to face the light emitting element;

a movable slit plate disposed between the light emitting element and the light receiving element and including a slit row in which a plurality of light transmissive slits each having a slit width of 180° in terms of angle and a plurality of light non-transmissive slits each having a slit width of 180° in terms of angle are alternately formed in a moving direction of the movable slit plate, wherein a slit pitch is 360°; and a stationary slit plate disposed between the light emitting element and the light receiving element and including a slit row in which a plurality of light transmissive slits each having a slit width of 180° in terms of angle and a plurality of light non-transmissive slits each having a slit width of (360-180)° in terms of angle are alternately formed, wherein:

defining the number of the plurality of light transmissive slits formed in the stationary slit plate as n where n is an integer of five or more, the value of k satisfies k=1±(⅓n); and defining the value of n as n=2q−r where q is an integer of two or more and r is an integer of 0≦r<q, the two slit rows of the stationary slit plate each include the q light transmissive slits when r=0, and one of the slit rows of the stationary slit plate includes q light transmissive slits and the other slit row of the stationary slit plate includes q−r light transmissive slits when r≠0; and the two slit rows of the stationary slit plate are shifted in position from each other in the moving direction by (360−360Xk)X(q−r)°.

3. An optical encoder device comprising:

a light emitting element;

a light receiving element disposed to face the light emitting element;

a movable slit plate disposed between the light emitting element and the light receiving element and including a slit row in which a plurality of light transmissive slits each having a slit width of 180° in terms of angle and a plurality of light non-transmissive slits each having a slit width of 180° in terms of angle are alternately formed in a moving direction of the movable slit plate, wherein a slit pitch is 360°; and a stationary slit plate disposed between the light emitting element and the light receiving element and including a slit row in which a plurality of light transmissive slits each having a slit width of 180° in terms of angle and a plurality of light non-transmissive slits each having a slit width of (360Xk-180)° in terms of angle are alternately formed, wherein:

defining the number of the plurality of light transmissive slits formed in the stationary slit plate as n where n is an integer of five or more, the value of k satisfies k=1±(⅓n);

defining the value of n as $$n = qm - \sum_{x=1}^{m-1} r_x$$

where q is an integer of two or more and $r_x$ is an integer of $0 \leq r < q$, the m slit rows of the stationary slit plate each include q light transmissive slits when r=0, and each include $q-r_x$ light transmissive slits when r≠0; and the m slit rows of the stationary slit plate include m kinds of slit rows and the m slit rows of the stationary slit plate are shifted in position from each other in the moving direction by (360−360Xk)X(q−r)°.

4. The optical encoder device according to claim 2, wherein adjacent two of the light transmissive slits arranged in the width direction are continuous with each other.

5. The optical encoder device according to claim 1, further comprising:

a multiplication circuit that electrically multiplies an optical signal outputted from the light receiving element.

6. The optical encoder device according to claim 1, wherein the value of n is determined so that the length of the slit row of the stationary slit plate may be as approximate as possible to the usable length of a light receiving surface of the light receiving element.

7. The optical encoder device according to claim 2, wherein the values of n, m and q are determined so that the length of the slit row of the stationary slit plate may be as approximate as possible to the usable length of a light receiving surface of the light receiving element.

8. The optical encoder device according to claim 3, wherein adjacent two of the light transmissive slits arranged in the width direction are continuous with each other.

9. The optical encoder device according to claim 2, further comprising:

a multiplication circuit that electrically multiplies an optical signal outputted from the light receiving element.

10. The optical encoder device according to claim 3, further comprising:

a multiplication circuit that electrically multiplies an optical signal outputted from the light receiving element.

11. The optical encoder device according to claim 3, wherein the values of n, m and q are determined so that the length of the slit row of the stationary slit plate may be as approximate as possible to the usable length of a light receiving surface of the light receiving element.

* * * * *

UNITED STATES PATENT AND TRADEMARK OFFICE
CERTIFICATE OF CORRECTION

PATENT NO. : 8,389,925 B2
APPLICATION NO. : 12/921259
DATED : March 5, 2013
INVENTOR(S) : Yoshihiro Shoji et al.

It is certified that error appears in the above-identified patent and that said Letters Patent is hereby corrected as shown below:

On the Title Page, Item (54), and in the Specification, Column 1, Line 1, Title, Delete "OPTICAL ENCODER DEVICE COMPRISING A MOVEABLE SLIT PLATE AND A STATIONARY SLIT PLATE" and insert --OPTICAL ENCODER DEVICE THAT INCLUDES A MOVEABLE SLIT PLATE AND A STATIONARY SLIT PLATE--.

Signed and Sealed this
Twenty-third Day of July, 2013

Teresa Stanek Rea
*Acting Director of the United States Patent and Trademark Office*